H. PIERINI.
TRAP.
APPLICATION FILED MAR. 18, 1921.

1,420,384.  Patented June 20, 1922.

WITNESSES

INVENTOR
Humbert Pierini,
BY
ATTORNEYS

UNITED STATES PATENT OFFICE.

HUMBERT PIERINI, OF GREENVILLE, MISSISSIPPI, ASSIGNOR TO ROBERT B. McMAHON, OF GREENVILLE, MISSISSIPPI.

TRAP.

1,420,384.   Specification of Letters Patent.   Patented June 20, 1922.

Original application filed October 29, 1920, Serial No. 420,426. Divided and this application filed March 18, 1921. Serial No. 453,267.

*To all whom it may concern:*

Be it known that I, HUMBERT PIERINI, a citizen of the United States, and a resident of Greenville, in the county of Washington and State of Mississippi, have invented certain new and useful Improvements in Traps, of which the following is a specification.

My invention is an improvement in traps and more especially a divisional part of my application filed October 29, 1920, under Serial Number 420,426. It has for its object to provide a trap especially adapted for use in catching mice, rats and the like, wherein a frame is provided having means for permitting it to be connected to a table top, board or the like, the frame supporting a plate which normally stands in the plane of the frame, but is so arranged that under a slight excess of weight at one end, it will tilt, the plate being adapted to be arranged above a container for water or the like into which the rodent is adapted to be dumped by the tilting of the plate, the frame having means for supporting bait at that end where the plate moves downward when it tilts, the attaching means being at the opposite end.

Figure 1:
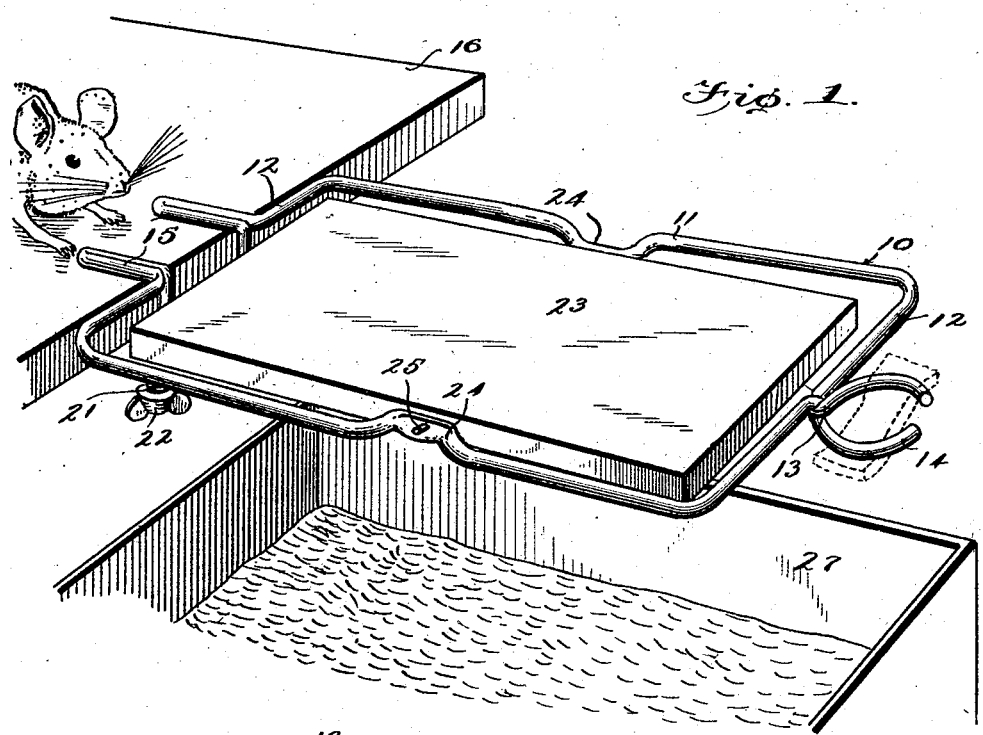
Figure 1 is a perspective view of the improved trap in use.
Figure 2:
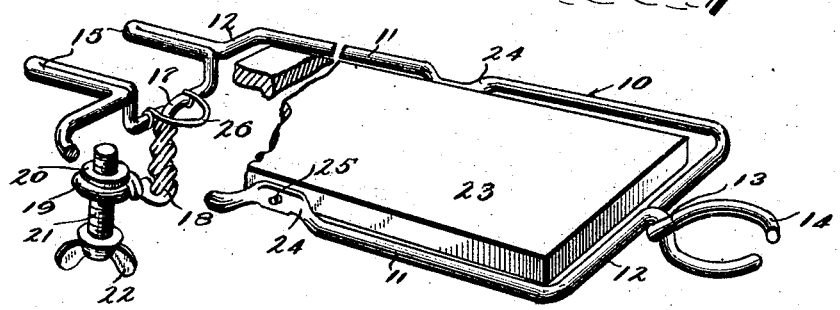
Figure 2 is a perspective view partly broken away.
Figure 3:
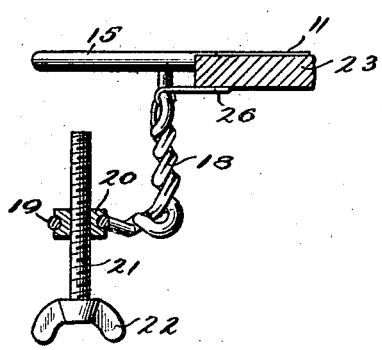
Figure 3 is a vertical section at the clamp.

In the embodiment of the invention shown, the trap is shown as comprising a substantially rectangular frame 10, which in the present instance, is composed of wire bent to form side members 11 and end members 12, the ends of the wire being at the center of one of the end members and twisted as shown at 13 to form an open eye, loops or coil 14 forming a bait support.

At the center of the other end a clamp is formed, said wire at the end opposite the coil 14 being bent outwardly and inwardly on each side of the center, to form a pair of outwardly extending arms 15, which are adapted to rest upon the top of the supporting plate or table 16.

Between the arms, the wire is bent downwardly and inwardly to form a downwardly offset cross-bar 17, and the ends are twisted together to provide a downwardly and outwardly extending arm 18 having at its free end, an eye 19. This eye carries a grooved nut 20 through which is threaded a set screw 21 having a wing head or operating part 22.

A plate 23 is arranged within the frame, the side members at approximately their centers having bent in and flattened portions 24 which are perforated to form bearings for journal pins 25 in the plate at the opposite edges thereof.

These journal pins 25 are nearer the coil than they are to the clamp, so that the plate will normally tip downward at the end adjacent to the clamp. A stop is however, indicated at 26, and in the form of a loop carried by the portion or bar 17 so as to project inwardly. This loop shaped stop is provided for preventing such tipping movement of the plate, and it will be readily understood that the plate is so balanced that a very slight excess weight on the opposite side of the journal pins 25 from the clamp will cause the plate to tilt downward at the end adjacent to the coil.

The improved trap is adapted to be arranged above a receptacle 27 for water. In operation, a suitable bait, as for instance, a piece of cheese is laid on the coil with the trap in the position of Figure 1. When a mouse or rat smells the cheese he will pass over the end of the frame onto the plate which will support his weight. When however, the animal passes beyond the pivot pins 25, the plate will tilt, dumping the animal into the water to result in drowning.

In view of the foregoing it is thought that the operation of the device will be readily understood and in view of the simplicity and practical value, that it will readily commend itself to those skilled in the art.

Having thus described my invention, what I claim is:—

1. A trap of the class described comprising a substantially rectangular metal frame and bent to form spaced horizontal upper and lower supporting arms for engaging above and below a support or table top with the frame extending horizontally at one end, the remote end being bent to form an extension for supporting the bait, a plate pivoted within the frame intermediate of the ends thereof and mounted to normally tilt downward at the end adjacent to said arms constituting means at one end of the frame for clamping the same in position, said plate being adapted to tilt in the opposite direction under a slight excess of weight at the end adjacent to the bait holder and means for normally preventing downward movement of the first named end of the plate.

2. A trap of the class described comprising a frame composed of a single section of wire bent to shape and to form spaced horizontal upper and lower supporting arms for engaging above and below a support, a clamping member carried by one of the arms and cooperating therewith to form clamping means to secure the device to a table top or the like, with the frame extending horizontally and having at the other end an extension bent therefrom for supporting bait, a plate pivoted within the frame intermediate the ends of the plate and mounted to normally tilt downwardly at the end adjacent to the clamp, said plate being adapted to tilt in the opposite direction under a slight excess of weight at the end adjacent to the bait holder, and a stop member carried by the frame adjacent to the supporting arm for normally preventing downward movement of the first named end of the plate.

3. A trap of the class described comprising a wire frame comprising sides and ends, one end having a bait holding coil and the other end bent outwardly and inwardly at two spaced points on each side of the center to form a pair of outwardly extending arms adapted to rest on top of a supporting plate or table, the wire between the arms being bent downwardly and inwardly to form a downwardly offset cross-bar, the ends being then twisted together to provide a downwardly and outwardly extending arm, an eye at the free end of the last-named arm, a nut therein, a set screw threaded therethrough to cooperate with the first-named arms, a plate pivoted intermediately at its opposite edges to the sides of the frame nearer the coil than the clamp formed by the first-named arms and set screw so that the plate will normally tip downward at the end adjacent the clamp, and a stop at the said end of the frame to support the plate against downward tipping at said end.

4. A device of the character specified comprising a substantially rectangular wire frame having means at one end for clamping the frame to a table top or the like with the frame extending horizontally and bent at the other end to form an extension coil for supporting bait, a plate pivoted within the frame intermediate the ends of the plate and mounted to normally tilt downward at the end adjacent to the clamp, said plate being adapted to tilt in the opposite direction under a slight excess of weight at the end adjacent to the coil, and means for normally preventing downward movement of the first named end of the plate, said frame being composed of wire bent to form supporting arms for engaging above and below the support at the end remote from the bait holder, one of said arms carrying a set screw cooperating with the other arm to secure the device in position.

5. In a trap of the class described, a frame for a tilting platform comprising a single section of wire bent to form sides and ends, one end being bent to form a bait holding coil and the other end bent outwardly and inwardly at spaced points at each side of the center to form a pair of outwardly extending arms adapted to rest on top of a supporting plate or table, the wire between the arms being bent downwardly and inwardly to form a downwardly offset cross bar, the ends being then twisted together to provide a downwardly and outwardly extending arm, an eye at the free end of the last named arm, a nut therein, a set screw threaded therethrough to cooperate with the first named arm, said frame being adapted to receive a pivoted plate intermediately of its opposite edges between the sides of the frame with the pivot nearer the coil than the clamp formed by the first named arm and set screw so that the plate will normally tilt downward at the end adjacent the clamp, and a wire stop member at the end of the frame adjacent the clamp to support the plate against downward tilting at said end.

HUMBERT PIERINI.